United States Patent Office 3,247,500
Patented Apr. 19, 1966

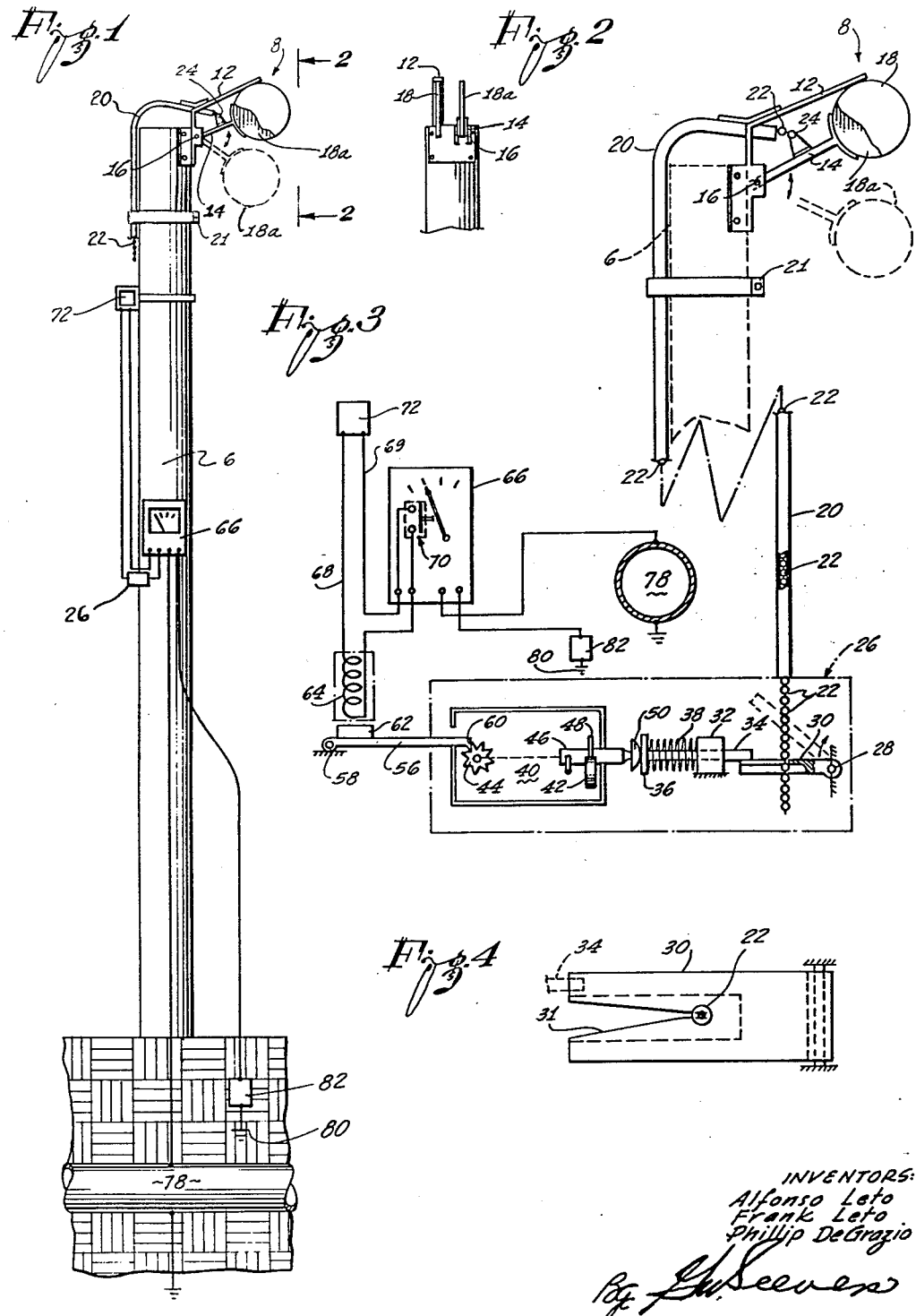

3,247,500
CATHODIC PROTECTION ALARM APPARATUS
Phillip De Grazio, 394 N. Simmons, Montebello, Calif.;
Alfonso Leto, 12255 Gerald Ave., Granada Hills, Calif.;
and Frank Leto, 8084 Cherrystone Ave., Panorama
City, Calif.
Filed Nov. 19, 1962, Ser. No. 238,538
3 Claims. (Cl. 340—248)

This invention relates to a novel and improved voltage monitoring system and more particularly to a novel and improved voltage monitoring system which utilizes the combination of a stored mechanical energy and the electrical energy from a natural source to produce a signal indicating the failure in an electrical circuit.

Pipelines, for example, for oil, gas, water and the like, are subject to corrosion caused in part, at least, by electrolytic action set up between the pipeline as one electrode and the ground or other material upon or into which the pipeline is placed as the other electrode. One conventional form of protection against this electrolytic corrosion is a cathodic protection.

Conventionally, the electrical power for this cathodic protection is obtained by making use of the steel in the pipeline as an anode and to drive a cathode magnesium rod into the ground at suitably spaced intervals as the cathode and connect this magnesium cathode to the pipeline. This, with the ground as a so-called electrolyte, forms a galvanic battery which sets up a current within the pipeline which bucks or neutralizes the electrolytic action within the pipe thereby reducing electrolytic corrosion to a minimum.

In modern day practices, pipelines are inspected by high-speed mobile transportation such as by truck or by air, and the old practice of pipeline walkers to inspect the pipelines for leaks and other troubles is passé. This is particularly true in remote and difficultly accessible areas. The cathodic protection used to protect the pipeline can become ineffective due to natural causes such as failure of the earth to act as a proper electrolyte, decay of the magnesium rod or even breakage of the electrical connection between the rod and the pipeline. The only manner in which such failure of the cathodic protection could be determined heretofore, was to manually check the voltage or current flow between the pipeline, the magnesium and the ground. This inspection, of course, is costly, slow, and often times the pipeline will be without cathodic protection for extended periods of time until the inspection crew can reach the trouble spot along the line in their regular rounds.

Briefly described, this invention contemplates a monitoring system that requires no batteries or electrical power other than natural elements to operate and includes a volt meter connected in series between the pipeline and the buried magnesium electrode which indicates the potential drop between the pipe and the magnesium anode. When the potential varies beyond desired limits, contact points are closed in the volt meter which are in series with a circuit energized by a solar cell or cells. The closing of the contacts in the volt meter actuates a solenoid which releases a trip mechanism in a stored mechanical energy device, such as a conventional spring-wound motor, a spring loaded gear train, weight motor or weight actuated gear train which, in turn, releases a mechanical trip mechanism connected to a semaphore signal held in an inoperative position by means of a latch and chain and which drops into an activated signalling position by means of gravity, upon the release of the chain from the latch brought about by the energy from the unwinding of the clock mechanism. The semaphore signal when operative is readily visible from a distance and can be observed by a lookout scanning long distances along the pipeline from a vantage point or from an air patrol plane. Upon the observance of a signal from the semaphore, the trouble spot is then reported to a repair crew who, being alerted, can go to the defective protection and make the necessary repairs.

Turning now to a more detailed description of our invention in which like views show like parts throughout:

FIGURE 1 shows a front elevation view illustrating a preferred embodiment of our invention;

FIGURE 2 shows a side elevation view of the top of the semaphore signal shown in FIGURE 1;

FIGURE 3 shows an enlarged side view of the signal pole of FIGURE 1 with the signal arms in an inoperative position together with a schematic view of the operating mechanism; and FIGURE 4 shows a top plan view of the chain latch shown in FIGURE 3.

Turning now to a more detailed description of the preferred embodiment illustrating our invention. The numeral 6 designates a pole or tower upon which a semaphore signal 8 is mounted. Signal 8 comprises a stationary arm 12 mounted on pole 6 in any suitable manner, as shown. Pivotally mounted adjacent stationary arm 12, also on pole 6, is a second arm 14 affixed by means of a pivot 16 of conventional design. Mounted upon the ends of arms 12 and 14 are two plates 18 and 18a respectively. Each of the plates 18 and 18a is colored the same color on the outside, such as black, and the same color on the inside but different from the color on the outside, such as red. Accordingly, when the pivotally mounted arm 14 is allowed to drop into the dotted line position, the red inside surface of plate 18a can be seen from a distance in one direction and the red inside surface of the stationary plate 18 supported by arm 12 can be seen from a considerable distance in the opposite direction.

An elongated tubular sleeve 20 is secured at one end in any suitable manner to stationary arm 12 and preferably, if desired, can be also secured by means of a strap clamp 21 along the pole 6 to give rigidity and support thereto. Within the tubular sleeve 20 is a flexible chain 22 such as the ball link chain, or, if desired, a flexible cable of any type may be used. The flexible chain 22 passes through the entire length of the tubular sleeve 20 and is securely attached at one end 24 in any suitable manner to the movable arm 14. The other end of chain 22 terminates a suitable distance outside the end of tubular sleeve 20, as shown in FIGURE 3.

The tubular sleeve 20 is inserted at its lower end into a case 26, which also preferably is mounted upon pole 6 and is located a sufficient distance above the ground to be safe from animals, snow, etc. The case 26 should be water and dustproof, to protect the internal mechanism from these elements over extended periods of time. Pivotally mounted at 28 within case 26 is a latch 30 provided with a V notch 31. The purpose of the latch 30 and the V notch 31 is to retain the chain 22 in position when the movable arm 14 is in a "cocked" position, as shown. Obviously, when latch 30 is released, as illustrated in FIGURE 3, the weight of arm 14 with its disks 18a thereon drops into an operative visible position, as shown in dotted lines, and the chain 22 recedes upward into tubular sleeve 20.

Within the case 26 also is a support bracket 32 through which an elongated pin 34 is slidably mounted. Preferably on one end of elongated pin 34 is a foot plate 36 and between the foot plate 36 and the bracket 32 is mounted a compression spring 38. As will be seen from FIGURE 3, compression spring 38 urges against both bracket 32 and foot plate 36 attempting to move the elongated pin 34 away from latch 30.

Also within case 26 is mounted a mechanical energy storing mechanism which for reasons of economy, a conventional spring clock motor has been found quite suitable, and is designated generally by the numeral 40. It is, however, to be understood, that a spring loaded gear train, weight motor or weight actuated gear train or the like, could be used without departing from the spirit of this invention. The clock spring motor 40 is provided with the conventional winding mechanism or stem 42 and with a balance wheel 44 with the balance arm removed. A second elongated pin 46 is slidably mounted in any desired manner upon the case of spring clock 40, as shown, and a dog 48 or other suitable locking or retaining means is mounted upon the winding stem 42 and is connected to the elongated pin 46 in such a manner so that when the clock spring is permitted to unwind by releasing the balance wheel, the dog 48 will be moved from the holding engagement with pin 46 and the pin 34 is free to be urged by spring 38, shown in FIGURE 1, backward toward the clock case 40. As shown, a suitable second foot plate 50 is mounted upon one end of elongated pin 46 and bears against the first mentioned foot plate 36. At this point, it will be seen that when the clock is wound and the arm 46 is urged into its outward or "cocked" position from the clock case 40, the first elongated pin 34 is held in position over the latch 30, as shown, and with the chain 22 pulled down, arm 14 is held raised by the chain 22 in an upright position, thereby hiding from view the inner or red faces of the disks 18 and 18a and the chain 22 is fastened into V notch 31, the arms 12 and 14 with their supporting plates 18 mounted face to thereon, will expose to the view of a person located some distance away but one color of a preselected nature, such as black. Conversely, when the dog 48 is moved from engagement with pin 46 by the clock motor winding stem or mechanism 42 due to the unwinding of the clock motor 40, pins 46 and 34 will be urged by spring 38 into an "uncocked" position. Latch 30 is thereby released and is pulled upward by the weight on chain 22, and semaphore 14 and plate 18a drop by gravity into an operative position. This exposes the inside red faces of plates 18 and 18a to view.

Also, as a matter of convenience and economy, the clock spring motor 40 is modified simply by removing the balance arm therefrom. In place of the balance arm there is provided a lever 56 which is pivoted at 58. Lever 56 is povided on the end thereof, opposite pivot 58, with a pawl 60 which coacts with the teeth on the balance wheel 44 in such a manner so that when the lever 56 is down, the pawl 60 engages the teeth of the balance wheel preventing the clock spring motor 40 from unwinding. Preferably mounted at any suitable position upon the lever 56 is a block of magnetic material 62. Associated with the magnetic material 62 is a high sensitive solenoid 64. The solenoid 64 is connected to a meter relay 66 by means of leads 68 and 69. A microswitch 70 is provided in the meter relay 66 and is connected in series in the circuit from the solenoid 64 to a solar cell 72. The meter relay 66 is adapted to be connected in series with a pipeline 78, ground 80 and a magnesium rod 82, driven into the ground forming the cathodic protection to the pipeline.

The meter relay 66 can be of any conventional design but preferably should be provided with suitable manual setting means (not shown) and can be provided with either a below minimum actuated microswitch or could, if desired, be provided also with an above maximum microswitch. The principal requirement for the meter relay and the microswitch is that it is adjustable so that switch 70 can be set in the circuit with the switch open as long as the voltage from the cathodic protection is maintained above or below the desired limits. As will be apperciated, the magnesium rod cathodic protection will vary in its voltage output from place to place depending upon soil conditions, pipe connections, etc., thus the desirability of providing manual means to set the limit or limits of the microswitch or switches.

Obviously, the case 26 and the solar cell 72 preferably are mounted on the pole 6 with the solar cell placed in a position to take advantage of full absorption of the energy from the sun's rays and to protect them from weather, predatory animals, humans, etc.

In operation, the semaphore or signal arm 14 is raised to its elevated position and the chain 22 is latched into the V notch 31. The clock spring motor 40 is wound tightly and the elongated pin 34 is urged into its latching position over the end of latch 30. Although the spring 38 is urging the pin 34 away from the latch 30, it is held in place by means of the dog 48 connected to the winding stem 42. The pawl 60 is permitted to drop down and engage the teeth of the balance wheel 44 and as long as the pawl 60 remains in this position, the clock spring will not unwind and release the latching assembly controlling the pin 34. When the voltage in the cathodic protection between the pipeline, the magnesium rod and the ground drops below the desired voltage setting, the microswitch 70 will close, which, in turn, will close the circuit connecting the solenoid 64 to the solar cell 72. The microswitch 70 remaining closed as long as the voltage on the cathodic protection remains below the selected limit, the solenoid 64 will be energized whenever the sun strikes the solar cell 72 and the lever 62 displaces the pawl 60 from the teeth of the balance wheel 44 which permits the clock spring motor to unwind. The cam 44 being turned with the winding mechanism 42, the pins 34 and 46 will be urged away from the latch 30 permitting the weight of the arm 14 with the plate 18a carried thereon, to pull the chain 22 out of the V notch 31 and accordingly, the arm 18 will then drop downward to the dotted line position, shown in FIGURE 1, where the red sides of each of the plates 17 and 18a become readily visible from either the air or at a distant point on the ground.

After the repairs to the cathodic protection are made, the device is reset by rewinding the clock and resetting the chain in the latch 30 and the meter relay is again reset for the limits commensurate with the voltage read in the particular cathodic protection.

From the foregoing it can be appreciated that there is provided an infinitely long life voltage monitoring system which is self-operating upon failure of the current being monitored and is dependent only upon the combination of the stored mechanical energy of the clock spring and the natural energy of the solar cell.

It is to be understood that modifications in type of meter relay, solenoids, switches, spring motor mechanisms and the like, can be resorted to without departing from the spirit of our invention as set forth in the appended claims.

What is claimed is:

1. In cathodic protective apparatus for an electrically conductive structure positioned in an electrolyte and which comprises an electrode positioned in said electrolyte in the vicinity of said structure, the combination of: a meter relay connected across said electrode and said structure to measure the voltage therebetween; an electric switch included in said meter relay in position to be actuated when said voltage falls below a particular value; a source of potential; a solenoid; circuit means connecting said source of potential through said switch to said solenoid to energize said solenoid when said switch is actuated; a mechanical energy storing unit including a trip mechanism coupled to said solenoid to be actuated thereby when said solenoid is energized; a mechanical signaling unit having a stand-by position and a signaling position; said mechanical signaling unit comprising a pivotally mounted semaphore arm, and said mechanical coupling means includes spring loaded latch mechanism coupled to said storing unit to be released thereby upon the actuation of said trip mechanism, and cable means connecting said spring loaded latch mechanism to said semaphore arm to release said arm upon the release of said latch mechanism; and means mechanically coupling said signaling unit to said mechanical energy storing unit to cause said signaling unit to be actuated from its stand-by position to its signaling position upon the actuation of said trip mechanism by said solenoid.

2. The combination defined in claim 1 in which said cable means normally holds said pivotally mounted semaphore arm in a stand-by position against the force of gravity, said arm falling to a signaling position upon the release of said spring loaded latch mechanism.

3. The combination defined in claim 2 in which said signaling unit further includes a stationary semaphore arm, and a pair of plates respectively mounted on said pivotally mounted semaphore arm and said stationary semaphore arm in side by side relationship when said pivotally mounted semaphore arm is in said stand-by position, the adjacent faces of said plates being revealed when said pivotally mounted semaphore arm falls to said signaling position.

References Cited by the Examiner

UNITED STATES PATENTS

| | | | |
|---|---|---|---|
| 521,046 | 6/1894 | Ross | 340—376 |
| 621,001 | 3/1899 | Warth | 340—242 |
| 623,444 | 4/1899 | Valentine. | |
| 1,599,936 | 9/1926 | Williams. | |
| 2,063,187 | 12/1936 | Nyquist | 340—242 X |
| 2,265,920 | 12/1941 | Maize | 324—29 X |
| 2,677,816 | 5/1954 | Quist | 116—118 X |
| 2,747,177 | 5/1956 | Keller | 340—274 X |
| 2,803,797 | 8/1957 | Cowles | 324—30 X |
| 2,862,177 | 11/1958 | Titterington | 324—29 |

FOREIGN PATENTS

| | | |
|---|---|---|
| 1,203,202 | 1/1960 | France. |
| 17,041 | 8/1902 | Great Britain. |

NEIL C. READ, *Primary Examiner.*

D. K. MYER, *Assistant Examiner.*